United States Patent
Xiang et al.

(10) Patent No.: US 12,021,615 B2
(45) Date of Patent: Jun. 25, 2024

(54) DATA PROCESSING METHOD, OPTICAL TRANSMISSION DEVICE, AND DIGITAL PROCESSING CHIP

(71) Applicant: HUAWEI TECHNOLOGIES CO., LTD., Shenzhen (CN)

(72) Inventors: Junling Xiang, Shenzhen (CN); Shuqian Zheng, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 109 days.

(21) Appl. No.: 17/554,025

(22) Filed: Dec. 17, 2021

(65) Prior Publication Data

US 2022/0109519 A1    Apr. 7, 2022

Related U.S. Application Data

(63) Continuation of application No. PCT/CN2020/095813, filed on Jun. 12, 2020.

(30) Foreign Application Priority Data

Jun. 19, 2019   (CN) .......................... 201910534192.7

(51) Int. Cl.
*H04L 1/18*    (2023.01)
*H04J 3/16*    (2006.01)
*H04L 1/00*    (2006.01)

(52) U.S. Cl.
CPC ............ *H04L 1/004* (2013.01); *H04J 3/1664* (2013.01)

(58) Field of Classification Search
None
See application file for complete search history.

(56) References Cited

U.S. PATENT DOCUMENTS 8,914,711 B2   12/2014 Gerstel et al.
9,438,275 B2    9/2016 Ishida et al.
(Continued)

FOREIGN PATENT DOCUMENTS

CN   101031074 A   9/2007
CN   101512989 A   8/2009
(Continued)

OTHER PUBLICATIONS

Sun Chenhua et al., Convergence Technology of Computer Network and Satellite Communication Network, Defense Industry Press, Oct. 2016, 5 pages(with an English abstract ).

(Continued)

*Primary Examiner* — Mujtaba M Chaudry
(74) *Attorney, Agent, or Firm* — Rimon PC (57) ABSTRACT

Embodiments of this application disclose a data processing method, an optical transmission device, and a digital processing chip, for improving service transmission performance. In the data processing method, an optical transmission device compresses a to-be-transmitted data stream to obtain a compressed data stream. The optical transmission device then obtains a size of a first payload area corresponding to the compressed data stream and maps the compressed data stream to a data frame, where the data frame includes an overhead area and a payload area. The payload area includes the first payload area and a second payload area. The second payload area carries the compressed data stream, and the first payload area carries a forward error correction (FEC) code. The data frame is then transmitted by the optical transmission device.

17 Claims, 7 Drawing Sheets

(56) References Cited

U.S. PATENT DOCUMENTS

| | | | |
|---|---|---|---|
| 10,013,200 B1* | 7/2018 | Shveidel | G06F 3/0613 |
| 2009/0324227 A1 | 12/2009 | Caggioni et al. | |
| 2013/0108273 A1* | 5/2013 | Valiveti | H04J 3/1652 |
| | | | 398/79 |
| 2014/0355991 A1 | 12/2014 | Cameirao et al. | |
| 2016/0315725 A1 | 10/2016 | Shin et al. | |
| 2017/0093440 A1* | 3/2017 | Camp | G06F 3/0689 |
| 2018/0175890 A1* | 6/2018 | Freudenberger | H04L 1/0045 |
| 2019/0110084 A1 | 4/2019 | Jia et al. | |
| 2020/0259896 A1* | 8/2020 | Sachs | H04J 3/0667 |

FOREIGN PATENT DOCUMENTS

| | | |
|---|---|---|
| CN | 103947141 A | 7/2014 |
| CN | 106301661 A | 1/2017 |
| CN | 106301678 A | 1/2017 |
| WO | 2015027755 A1 | 3/2015 |
| WO | 2016106584 A1 | 7/2016 |

OTHER PUBLICATIONS

Xie Jun, Digital Encapsulation Technology and Its Application, Xiandai Youxian Chuanshu, Dec. 2001, 8 pages (with an English abstract).

\* cited by examiner

DATA PROCESSING METHOD, OPTICAL TRANSMISSION DEVICE, AND DIGITAL PROCESSING CHIP

CROSS-REFERENCE TO RELATED APPLICATIONS

This application is a continuation of international No. PCT/CN2020/095813 filed on Jun. 12, 2020, which claims priority to Chinese Patent Application No. 201910534192.7 filed on Jun. 19, 2019. The disclosures of the aforementioned applications are hereby incorporated by reference in their entireties.

TECHNICAL FIELD

This application relates to the optical communications field, and in particular, to a data processing method, an optical transmission device, and a digital processing chip.

BACKGROUND

As a mainstream optical transmission technology, an optical transport network (OTN) can implement transmission, scheduling, and management of large-capacity services. With the growth of service traffic, the beyond-101G era has evolved into the 400G era and beyond. Correspondingly, the rate of an OTN interface is constantly growing, yet it still needs to support the same transmission distance. As a result, larger channel noise is often present in a service transmission process, and OTN service transmission performance is generally poor.

SUMMARY

Embodiments of this application provide a data processing method, an optical transmission device, and a digital processing chip that are used to improve service transmission performance.

According to a first aspect, an embodiment of this application provides a data processing method. The method includes the following steps:

An optical transmission device compresses a to-be-transmitted data stream to obtain a compressed data stream. Then, the optical transmission device obtains a size of a first payload area corresponding to the compressed data stream. Next, the optical transmission device generates a data frame based on the compressed data stream. The data frame includes an overhead area and a payload area. The payload area includes the first payload area and a second payload area. The second payload area carries the compressed data stream. The first payload area carries a forward error correction (FEC) code. After the data frame is generated, the optical transmission device transmits the data frame.

In an exemplary implementation, the to-be-transmitted data stream is compressed, so that a part of the payload area may be reserved in the data frame obtained by subsequent mapping, and may be used to carry an FEC code. This is equivalent to developing an area for carrying an FEC code in the data frame, and service transmission performance can be improved.

Optionally, in some possible implementations, the obtaining of a size of a first payload area corresponding to the compressed data stream includes: first obtaining a compression ratio of the compressed data stream. The compression ratio is a ratio of a data volume of the compressed data stream to a data volume of the to-be-transmitted data stream. Next, the size of the first payload area is determined based on the compression ratio. In these implementations, a smaller compression ratio indicates a larger reservable first payload area. In such case, the size of the first payload area is dynamically determined by calculating the compression ratio, so that an area obtained through compression may be fully used for the FEC code, which further improves service transmission performance.

It should be noted that, a fixed size may alternatively be preconfigured for the first payload area. In other words, the size of the first payload area remains the same regardless of the compression ratio.

Optionally, in some possible implementations, that the size of the first payload area is determined based on the compression ratio includes:

A correspondence between at least one compression ratio interval and a payload area size is obtained. Then, a target compression ratio interval to which the compression ratio belongs is determined. Next, a payload area size corresponding to the target compression ratio interval, namely, a size of a reservable first payload area, may be determined based on the foregoing correspondence. In these implementations, a specific manner of determining the size of the first payload area based on the compression ratio is provided.

Optionally, in some possible implementations, the generating of a to-be-transmitted data frame based on the compressed data stream includes: performing rate adaptation on the compressed data stream; and mapping the rate-adapted compressed data stream to the data frame, where a digital encapsulation structure of the data frame includes an optical data unit (ODU), an optical transport unit (OTU), or a flexible optical transport network (FlexO) frame. In these implementations, certain digital encapsulation structures of the data frame are provided, further improving the scalability of the solutions disclosed herein.

Optionally, in some possible implementations, a transmission rate of the data frame is less than a standard transmission rate corresponding to the digital encapsulation structure. In these implementations, because the to-be-transmitted data frame is compressed, the data frame may be sent at a transmission rate less than the standard transmission rate corresponding to the digital encapsulation structure. In this way, assuming the transmission distance remains the same, the noise in the transmission process can be reduced and the transmission performance is improved.

Optionally, in some possible implementations, before the to-be-transmitted data stream is compressed to obtain the compressed data stream, the method further includes: converting a first data format of the to-be-transmitted data stream into a second data format. A length of the second data format is less than that of the first data format. In these implementations, without affecting valid data, the data length of the to-be-transmitted data stream can be reduced through transcoding, so as to reduce the transmission rate, increase an optical signal-to-noise ratio (OSNR) margin, withstand larger channel noise, and improve transmission performance.

Optionally, in some possible implementations, the compressing of a to-be-transmitted data stream to obtain a compressed data stream includes:

compressing the to-be-transmitted data stream to obtain the compressed data stream based on a preset compression algorithm. The compression algorithm includes dictionary encoding or entropy encoding. Several possible compression algorithms are provided, as implementation examples.

Optionally, in some possible implementations, the to-be-transmitted data stream is a non-scrambled data stream.

According to a second aspect, an embodiment of this application provides an optical transmission device that includes:

a processor, a memory, and an optical transceiver, where the processor, the memory, and the optical transceiver are interconnected by a data line, and the processor invokes program code in the memory to perform the following steps:

compressing a to-be-transmitted data stream to obtain a compressed data stream;

obtaining a size of a first payload area of the compressed data stream, where the first payload area carries an FEC code;

generating a data frame based on the compressed data stream, where the data frame includes an overhead area and a payload area, the payload area includes the first payload area and a second payload area, and the second payload area carries the compressed data stream; and sending the data frame to the optical transceiver; where the optical transceiver sends the data frame obtained after FEC processing.

Optionally, in some possible implementations, the processor is configured to:

obtain a compression ratio of the compressed data stream, where the compression ratio is a ratio of a data volume of the compressed data stream to a data volume of the to-be-transmitted data stream; and determine the size of the first payload area based on the compression ratio.

Optionally, in some possible implementations, the processor is configured to:

obtain a correspondence between at least one compression ratio interval and a payload area size;

determine a target compression ratio interval to which the compression ratio belongs; and determine, based on the correspondence, the size of the first payload area that corresponds to the target compression ratio interval.

Optionally, in some possible implementations, the processor is configured to:

perform rate adaptation on the compressed data stream; and map the rate-adapted compressed data stream to the data frame, where a digital encapsulation structure of the data frame includes an ODU, an OTU, or a FlexO frame.

Optionally, in some possible implementations, a transmission rate of the data frame is less than a standard transmission rate corresponding to the digital encapsulation structure.

Optionally, in some possible implementations, before compressing the to-be-transmitted data stream to obtain the compressed data stream, the processor is further configured to:

convert a first data format of the to-be-transmitted data stream into a second data format, where a length of the second data format is less than that of the first data format.

Optionally, in some possible implementations, the processor is configured to:

compress the to-be-transmitted data stream based on a preset compression algorithm to obtain the compressed data stream, where the compression algorithm includes dictionary encoding or entropy encoding.

Optionally, in some possible implementations, the to-be-transmitted data stream is a non-scrambled data stream.

According to a third aspect, an embodiment of this application provides a digital processing chip. The chip includes a processor and a memory, and the memory and the processor are interconnected by a data line. The memory stores an instruction, and the processor is configured to perform the data processing method according to implementations of the first aspect.

According to a fourth aspect, an embodiment of this application provides a computer storage medium that stores instructions. When the instructions are run on a computer, the computer is enabled to perform the data processing method according to the implementations of the first aspect.

According to a fifth aspect, an embodiment of this application provides a computer program product including an instruction. When the computer program product is run on a computer, the computer is enabled to perform the data processing method according to any implementation of the first aspect.

It may be learned from the foregoing technical solutions that, the embodiments disclosed in this application have the following advantages: a to-be-transmitted data stream is compressed so that a part of the payload area may be reserved in the data frame obtained by subsequent mapping and may be used to carry an FEC code. This is equivalent to developing a part of the payload area for carrying an FEC code inside the data frame, in addition to the approach of adding to an existing payload area for carrying an FEC code outside the data frame. In general, the available area for FEC codes is enlarged, and the service transmission performance is improved.

DESCRIPTION OF EMBODIMENTS

Embodiments of this application provide a data processing method, an optical transmission device, and a digital processing chip, which are used to improve service transmission performance. It should be noted that, the terms "first", "second", "third", "fourth", and so on in the specification, claims, and accompanying drawings of this application are intended to distinguish between similar objects but do not restrict a specific order or sequence. It should be understood that the foregoing terms nay be interchangeable in proper circumstances so that the embodiments described in this application can be implemented in other orders than the order described herein. Moreover, the terms "include", "have", or any other variant thereof are intended to cover a non-exclusive inclusion. For example, a process, method, system, product, or device that includes a series of steps or units is unnecessarily limited to the clearly listed steps or units, but may include other steps or units that are not explicitly listed or are inherent to the process, method, product, or device.

The embodiments of this application are applicable to an optical network, for example, an optical transport network. An optical network is usually formed by a plurality of devices connected through optical fibers. The plurality of devices may be formed into different types of topologies such as linear, ring, and mesh topologies as required.

Figure 1:
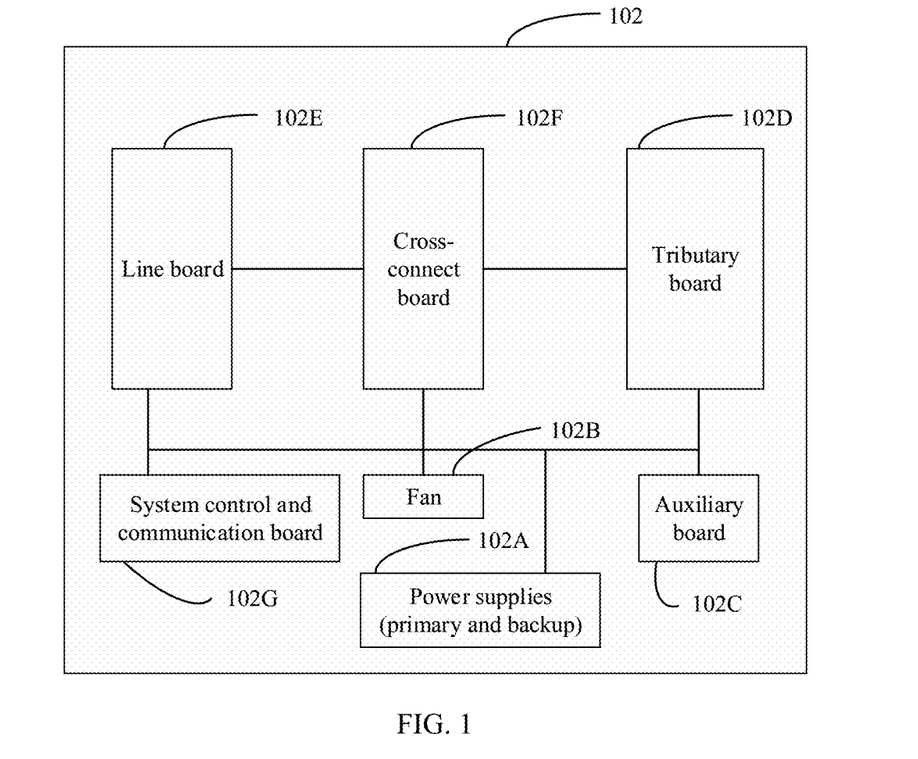
FIG. 1 is a schematic structural diagram of the hardware of an optical transmission device.

FIG. 1 is a schematic structural diagram of the hardware in an optical transmission device 102. Specifically, the device 102 includes a power supply 102A, a fan 102B, and an auxiliary board 102C, and may further include a tributary board 102D, a line board 102E, a cross-connect board 102F, an optical layer processing board (not shown in the figure), and a system control and communication board 102G. It should be noted that, the types and quantity of boards included in the device 102 may vary with the requirements. For example, a network device serving as a core node may not have the tributary board 102D. A network device serving as an edge node may have a plurality of tributary boards 102D. The power supply 102A is configured to supply power to the device, and may include an active power supply and a standby power supply. The fan 102B is configured to dissipate heat for the device 102. The auxiliary board 102C provides auxiliary functions such as an external alarm or access to an external clock. The tributary board 102D, the cross-connect board 102F, and the line board 102E are mainly configured to process an electrical layer signal (for example, an ODU frame in an OTN) of an optical network. The tributary board 102D is configured to receive and send various customer services, for example, a synchronous digital hierarchy (SDH) service, a packet service, an Ethernet service, and a fronthaul service. Further, the tributary board 102D may be divided into a customer-side optical module and a processor. The customer-side optical module may be an optical transceiver, which is configured to receive and/or send a customer's signal. The processor is configured to map a customer's signal to and demap a customer's signal from an ODU frame. The cross-connect board 102F is configured to exchange an ODU frame, and complete exchanges of one or more types of ODU signals. The line board 102E implements processing on a line-side ODU frame. Specifically, the line board 102E may be divided into a line-side optical module and a processor. The line-side optical module may be a line-side optical transceiver, which is configured to receive and/or send an ODU signal. The processor is configured to implement multiplexing and demultiplexing or mapping and demapping processing on a line-side ODU frame. The system control and communication board 102G is configured to implement system control and communication. Specifically, a backplane may be used to collect information from different boards or send a control instruction to a corresponding board. It should be noted that, unless otherwise specified, there may be one or more specific components (for example, processors). This application sets no limitation thereto. It should be further noted that, this application sets no limitation on the type of a board included in the device, specific functional designs, or a quantity of boards. It should be noted that, the data processing method in this application may be implemented on the line board 102E. Alternatively, the tributary board 102D and the line board 102E may be integrated to implement the data processing method in this application.

With the growth of service traffic, the beyond-100G era has evolved into the 400G era and beyond. Correspondingly, an OTN interface is provided with a constantly growing data transmission rate, but it still needs to support the same transmission distance. As a result, larger channel noise is engendered in a service transmission process, and service transmission performance becomes poor. In view of this, an embodiment of this application provides a data processing method to improve the service transmission performance, as described below.

Figure 2:
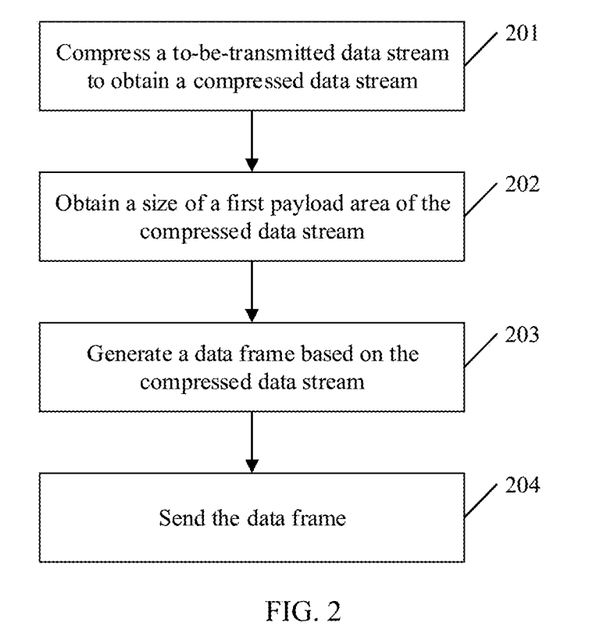
FIG. 2 is a schematic diagram of an embodiment of a data processing method according to this application.

FIG. 2 is a schematic diagram of an embodiment of a data processing method according to this application. In this example, the data processing method includes the following steps.

201. Compress a to-be-transmitted data stream to obtain a compressed data stream.

In this embodiment, an optical transmission device first compresses the to-be-transmitted data stream to obtain the compressed data stream. The to-be-transmitted data stream may be a service that the optical transmission device needs to send, such as an Ethernet service, an SDH service, or a constant bit rate (CBR) service, which is not limited herein. Specifically, the optical transmission device may compress the to-be-transmitted data stream by using a preset compression algorithm. The compression algorithm may be dictionary encoding, entropy encoding (for example, Huffman coding or arithmetic coding), or the like, which is not specifically limited herein.

The following uses an example to describe a compression algorithm that may be used in this application. For example, the compression algorithm may use a shorter bit sequence to represent data with a higher occurrence frequency and a longer bit sequence to represent data with a lower occurrence frequency based on a statistical model. In this way, lossless compression can be achieved by reducing redundant information while ensuring unchanged valid services. For example, if the to-be-transmitted data stream is "ABACCDA", the data stream can be distinguished through binary encoding because it includes only four types of characters. Assuming that codes of A, B, C, and D are respectively 00, 01, 10, and 11, the foregoing data stream is "00010010101100" (14 bits in total). Because each character has a different occurrence frequency, alternatively, a shorter code can be used to represent a character with a higher occurrence frequency and a longer code can be used to represent a character with a lower occurrence frequency, so that the total length of a code sequence is reduced. In terms of occurrence frequency, A>C>B=D. If A is represented by 0, C is represented by 10, B is represented by 110, and D is represented by 111, the compressed data stream obtained by compressing the to-be-transmitted data stream is 0110010101110 (13 bits in total).

Optionally, the to-be-transmitted data stream is a non-scrambled data stream. That is, a to-be-transmitted data stream is not scrambled before compression, or a scrambled to-be-transmitted data stream is descrambled before being compressed. In addition, to help a receive end correctly restore data, compression usually starts from the first byte at a boundary of valid service data in the to-be-transmitted data stream. For example, if the to-be-transmitted data stream is a Media Access Control (MAC) frame, compression starts from the first byte at the boundary of the frame. If the to-be-transmitted data stream is a code block of 66B, 257B, or the like, compression starts from the first byte at the boundary of the code block.

Figure 3:
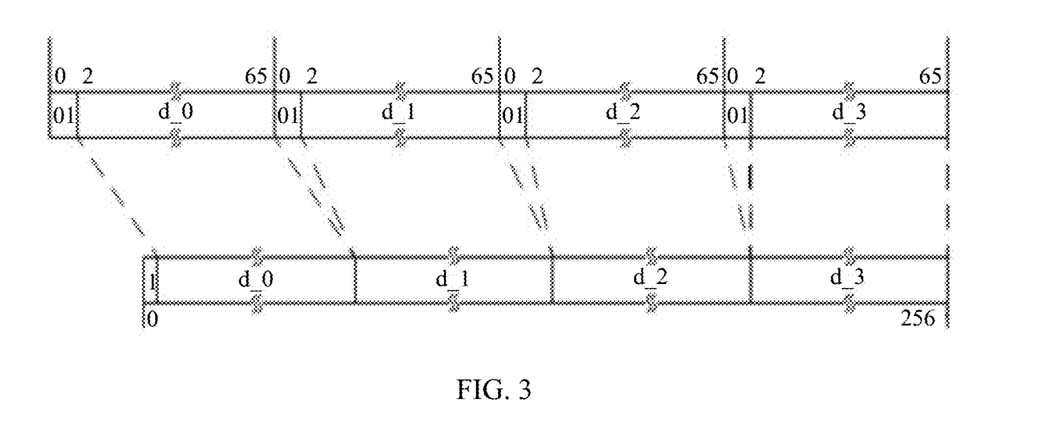
FIG. 3 is a schematic diagram of an example transcoding manner.

Optionally, transcoding may further be performed on the to-be-transmitted data stream before compression. FIG. 3 is a schematic diagram of a possible transcoding manner. For example, a first data format of the to-be-transmitted data stream before transcoding is 64B/66B, and a second data format of the to-be-transmitted data stream after transcoding is 256B/257B. It can be learned that, before transcoding, every piece of 64-bit data corresponds to a 2-bit synchronization header, and after transcoding, every piece of 256-bit data corresponds to a 1-bit synchronization header. With transcoding, the data length of the to-be-transmitted data stream is decreased, the transmission rate is reduced, an OSNR margin is increased, larger channel noise can be tolerated, and transmission performance is improved.

202. Obtain a size of a first payload area of the compressed data stream.

Compared with mapping the to-be-transmitted data stream and the compressed data stream based on a same frame format, in the methods of this application, a part of a payload area, namely, the first payload area, may be reserved in a frame obtained by mapping the compressed data stream. In this case, the size of the first payload area may be first determined before generating the frame through mapping.

Specifically, a compression ratio may be calculated after the compression processing. The optical transmission device may preconfigure and store a correspondence between at least one compression ratio interval and a payload area size. After determining that the calculated compression ratio falls within a target compression ratio interval, the optical transmission device may determine, based on the correspondence, the size of the first payload area that corresponds to the target compression ratio interval. The compression ratio may be a ratio of a data volume of the compressed data stream to a data volume of the to-be-transmitted data stream, or a ratio of a rate of the compressed data stream to a rate of the to-be-transmitted data stream. This is not specifically limited herein.

An example of the correspondence is shown in Table 1 below. For example, if the compression ratio is 98% and falls within a compression ratio interval of 97% to 100% (greater than or equal to 97% and less than 100%), it can be determined that the size of the first payload area is 456 bytes. For another example, if the compression ratio is 95% and falls within a compression ratio interval of 95% to 97% (greater than or equal to 95% and less than 97%), it can be determined that the size of the first payload area is 761 bytes, and so on. It may be understood that, if the digital encapsulation structures of frames generated through mapping are different, the payload area sizes corresponding to a same compression ratio interval may also be different. In other words, a corresponding correspondence between a compression ratio interval and a payload area size may be configured for each digital encapsulation structure.

TABLE 1

| Compression ratio interval | Size of the first payload area |
|---|---|
| 97%-100% | 456 bytes |
| 95%-97% | 761 bytes |
| 93%-95% | 1066 bytes |
| . . . | . . . |

Figure 4:
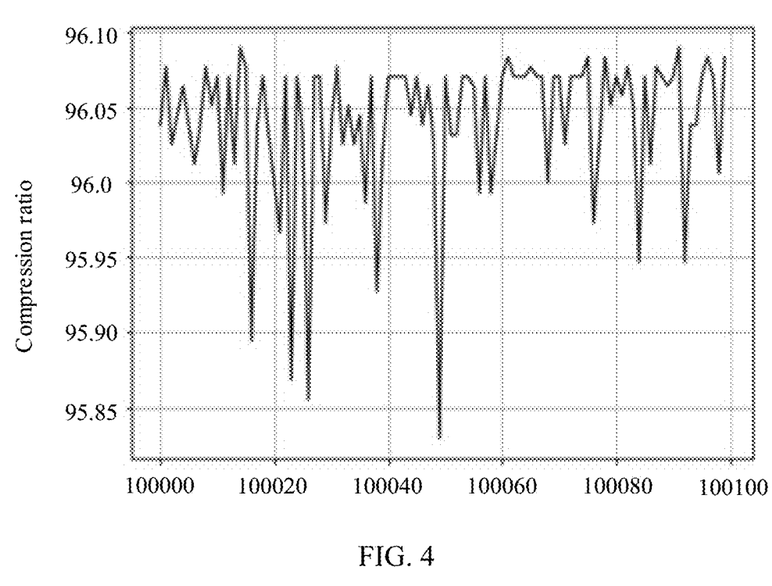
FIG. 4 is a schematic diagram of simulation of an example compression ratio.

FIG. 4 is a schematic diagram of a simulation of a possible compression ratio. The vertical coordinate indicates a compression ratio, and the horizontal coordinate indicates a sequence number of a data block. It may be understood that the compression processing may be dividing the to-be-transmitted data stream by equal length and performing compression by segment. Because each segment of data may be different, the compression ratio of each segment of data varies after compression. Therefore, the compression ratio of each segment of data may be separately calculated, and an average value may be used to calculate the compression ratio of the foregoing compressed data stream.

It should be noted that, the size of the first payload area may alternatively be set to a fixed value, for example, 456 bytes. In other words, the size of the first payload region is the same regardless of an actual compression ratio. In this application, the size of the first payload area may be dynamically determined based on the compression ratio, or a preset value may be configured as the size of the first payload area. This is not specifically limited herein.

203. Generate a data frame based on the compressed data stream.

In this embodiment, after the compressed data stream is obtained through compression, a data frame may be generated based on the compressed data stream. Further, rate adaptation is performed on the compressed data stream. The data frame includes an overhead area and a payload area. Further, the payload area includes the first payload area and a second payload area. The second payload area carries the compressed data stream, and the first payload area carries an FEC code. That is, through compression processing, a part of the payload area of the data frame may be reserved for carrying an FEC code. An area for carrying an FEC code is enlarged without affecting valid data transmission, improving service transmission performance.

The following describes a specific process of generating the data frame based on the compressed data stream.

First, the Generic Framing Procedure (GFP) may be used to add a GFP block header to the compressed data stream to obtain a GFP frame, rate matching may be performed by adding an idle block to the GFP frame, and further, the rate-adapted GFP frame may be mapped to the data frame. The digital encapsulation structure of the data frame in this application may include an optical data unit (ODU), an optical transport unit (OTU), a flexible optical transport network (FlexO) frame, or the like. The OTU may further include an Optical Transport Unit-k (OTUk), an Optical Transport Unit-Cn (OTUCn), and the like, which is not specifically limited herein.

It should be noted that, because a compression processing process may involve compressing the data stream by segment based on a specific length, the data length of each compressed segment may be varying, and therefore the data lengths of different segments in the compressed data stream may be unequal. However, the compressed data stream may be re-divided into segments by equal length. This is not specifically limited herein.

The following describes a data frame format in this embodiment by using an ODU frame structure as an example.

Figure 5:
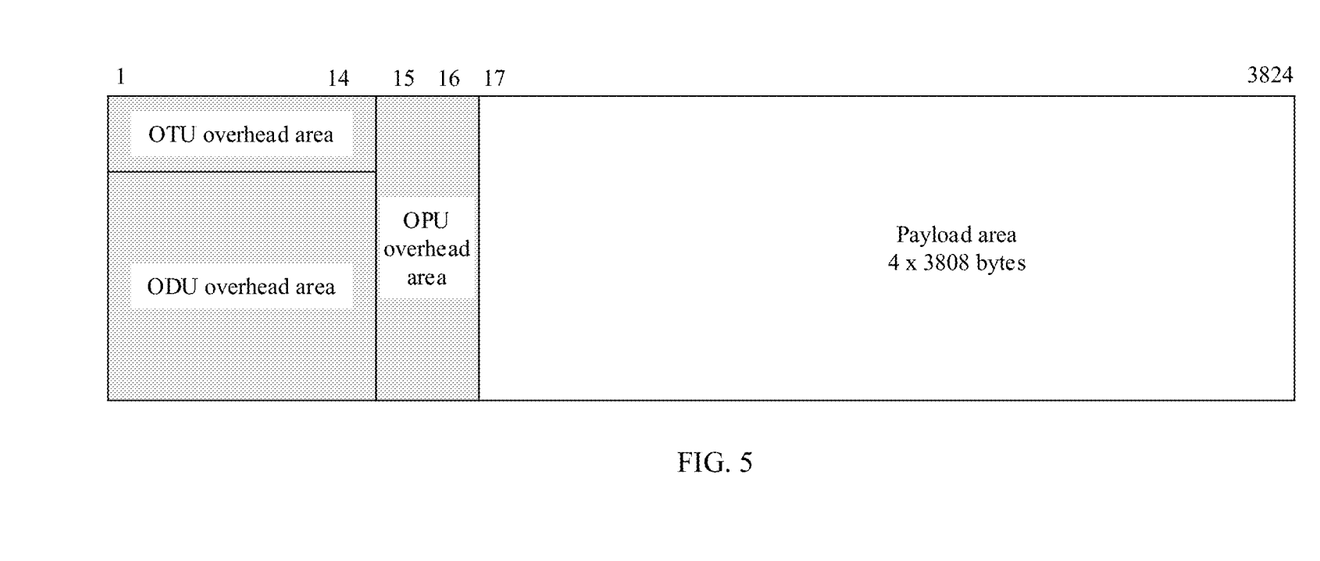
FIG. 5 is a schematic diagram of an ODU frame format.

FIG. 5 is a schematic diagram of an ODU frame format. An ODU frame has four rows of 3824 byte columns, including an OTU overhead area, an ODU overhead area, and an optical payload unit (OPU) area. The OPU area further includes an OPU overhead area (2 columns) and a payload area (3808 columns). In this example, a part of the payload area is used as the first payload area through division.

A specific division manner is described below.

Figure 6:
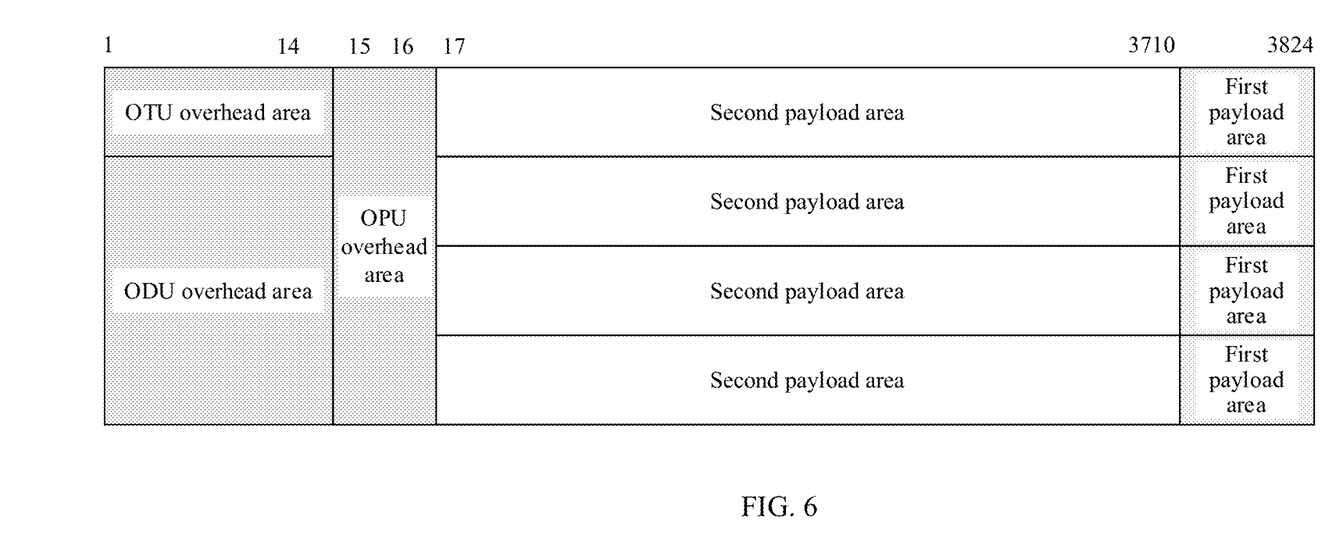
FIG. 6 is a schematic diagram of a first payload area in an example payload area.

FIG. 6 is a schematic diagram of a reserved first payload area in a possible payload area. For example, if the compression ratio is 98%, the size of the first payload area is 456 bytes with reference to in Table 1. Because the payload area has four rows in total, the last 114 bytes of each row may be reserved as the first payload area. The remaining area is used as the second payload area to carry the compressed data stream. The specific reserved location of the first payload area is not limited in this application.

It may be understood that payload type (PT) overheads may be added to the OPU overhead area to indicate that the second payload area currently carries the compressed data stream.

Figure 7:
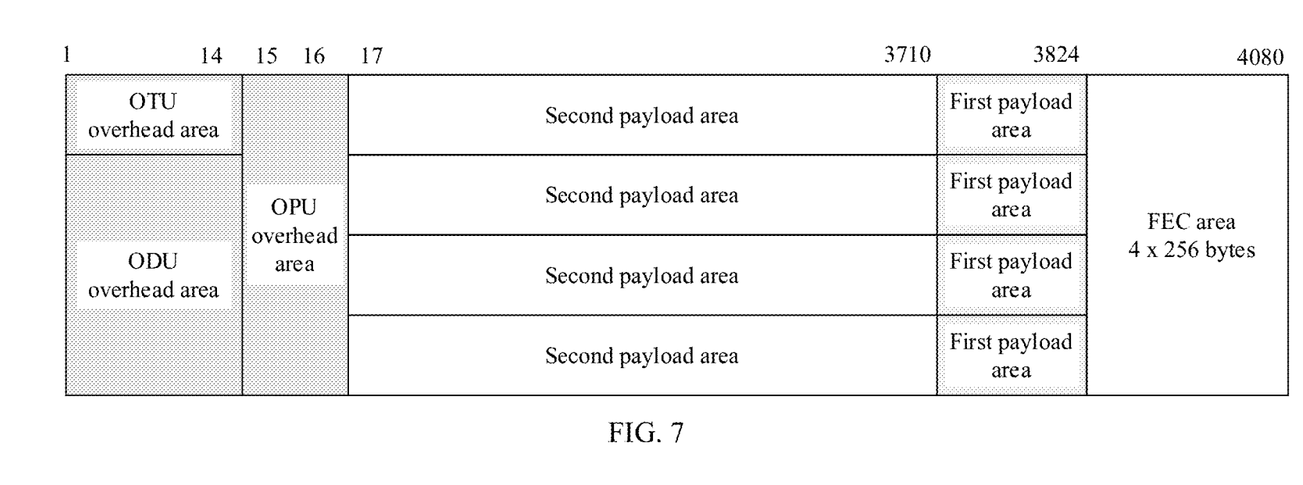
FIG. 7 is a schematic diagram of an OTUk frame format.

FIG. 7 is a schematic diagram of an OTUk frame format. It can be learned that a 256-column FEC area may be developed outside the ODU frame structure, and the developed frame structure is defined as an OTUk frame structure. In this case, based on the methods in this application, a part of the first payload area may be further obtained inside the ODU frame structure through division based on the original FEC area so as to carry an FEC code. This is equivalent to developing an FEC area in the OTUk frame.

204. Send the data frame.

In an embodiment, after mapping the compressed data stream to the data frame, the optical transmission device may perform FEC processing on the data frame and send the data frame. It may be understood that, in addition to the FEC processing, another procedure such as optical digital signal processing (ODSP) may be performed on the data frame to send the data frame. This is not specifically limited herein.

It should be noted that, the foregoing steps 201 to 203 and the FEC processing may be integrated on a same chip for implementation. In addition, alternatively, the foregoing steps 201 to 203 and the FEC processing may be separately implemented on two mutually independent chips. This is not specifically limited herein.

Optionally, a data frame finally obtained in the foregoing manner corresponds to a standard transmission rate. However, because the to-be-transmitted data stream has been compressed, the compressed data stream may be mapped into a data frame that can be sent at a rate less than the standard transmission rate. In other words, the transmission rate of the data frame is less than the standard transmission rate corresponding to the digital encapsulation structure of the data frame. For example, the digital encapsulation structure of the data frame is OTU4, and the standard rate of the OTU4 is 111.809 Gbit/s. If the compression ratio is 97%, an OTU4 with a new rate may be defined. The rate of the OTU4 may be 108.454 Gbit/s (111.809×97%), which is less than the standard rate of the OTU4.

It may be learned from the foregoing description that the to-be-transmitted data stream is compressed so that a part of the payload area may be reserved in the data frame obtained by subsequent mapping and may be used to carry an FEC code. This is equivalent to developing, in addition to an existing payload area for carrying an FEC code outside the data frame, a part of the payload area for carrying an FEC code inside the data frame. In general, the available area for the FEC code is increased and the service transmission performance is improved.

The following describes a processing procedure after the receive end receives the foregoing data frame.

Figure 8:
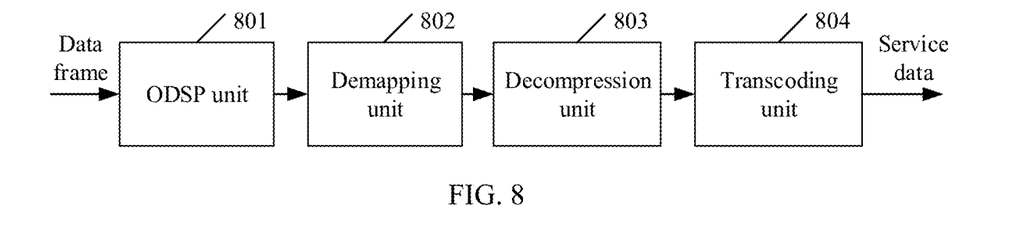
FIG. 8 is a schematic flowchart of processing a data frame by a receive end.

FIG. 8 is a schematic flowchart of processing a data frame by a receive end. After receiving the data frame, the receive end first performs optical-to-electrical conversion. Then, an ODSP unit 801 performs digital signal processing and FEC decoding, and outputs an OTUk signal. Next, a demapping unit 802 determines a frame header and obtains a data stream of a GFP frame through demapping. Then, a decompression unit 803 decompresses the data stream output by the demapping unit 802, to obtain service data. Optionally, if a data frame sent by a transmit end is transcoded, the receive end may further include a transcoding unit 804, configured to restore service data to a data format used before the transcoding.

It should be noted that, the FEC decoding performed by the receive end may be performed on the first payload area generated by the transmit end. Alternatively, the FEC decoding may be performed on the FEC area of the existing data frame and the first payload area generated by the transmit end. Alternatively, the FEC decoding may be performed on the first payload area generated by the transmit end and a plurality of other existing areas that can carry an FEC code. For a processing process of the receive end, refer to the related descriptions of the transmit end and the transmitting method. Details are not described herein again.

The foregoing describes the data processing method in the embodiments of this application, and the following describes the optical transmission device in the embodiments of this application.

Figure 9:
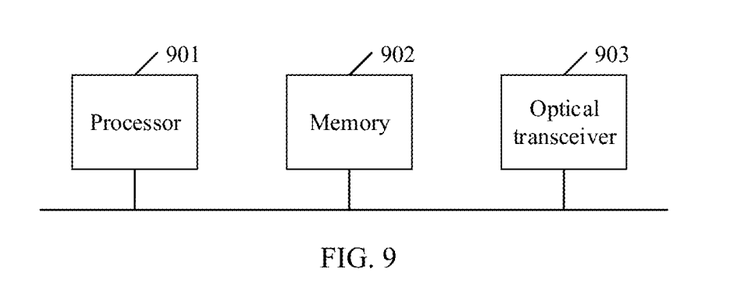
FIG. 9 is a schematic structural diagram of an example optical transmission device.

FIG. 9 is a schematic structural diagram of a possible optical transmission device. The optical transmission device includes a processor 901, a memory 902, and an optical transceiver 903. The processor 901, the memory 902, and the optical transceiver 903 are interconnected by using a data line. The memory 902 is configured to store a program instruction and data. It should be noted that, the optical transmission device may be the optical transmission device that implements the data processing method in the embodiment shown in FIG. 2.

In a possible implementation, the memory 902 stores a program instruction and data that support the steps shown in FIG. 2, and the processor 901 and the optical transceiver 903 are configured to perform the method steps shown in FIG. 2. Specifically, the processor 901 is configured to perform steps 201 to 203 shown in FIG. 2 and the FEC processing, and the optical transceiver 903 is configured to send a data frame obtained after the FEC processing. Alternatively, the processor 901 is configured to perform steps 201 to 203 shown in FIG. 2, and the optical transceiver 903 performs FEC processing and sends a data frame. Optionally, the processor 901 may be divided into a compression unit, an obtaining unit, and a mapping unit, which are configured to respectively perform steps 201 to 203 shown in FIG. 2.

An embodiment of this application further provides a chip. The chip integrates a circuit and one or more interfaces that are configured to implement the function of the processor 901. When a memory is integrated into the chip, the chip may complete the method steps in any one or more of the foregoing embodiments. When no memory is integrated into the chip, the chip may be connected to an external memory over an interface. Based on the program code stored in the external memory, the chip implements the methods performed by the optical transmission device in the foregoing embodiments.

It should be noted that, executed actions described above are merely examples. For actions actually executed by the processor 901 and the optical transceiver 903, refer to the actions/steps mentioned in related descriptions in FIG. 2. It should be further noted that, in the structural hardware diagram of the OTN shown in FIG. 1, the processor 901, the memory 902, and the optical transceiver 903 may be located on a line board, or may be located in a tributary-line integrated board in which a tributary board and a line board are integrated, which is not specifically limited herein.

A person of ordinary skill in the art may understand that all or some of the steps of the embodiments may be implemented by hardware or a program instructing related hardware. The program may be stored in a computer-readable storage medium. The storage medium may include: a read-only memory, a random access memory, or the like. Specifically, for example, the foregoing processing unit or processor may be a central processing unit, a general-purpose processor, a digital signal processor (DSP), an application-specific integrated circuit (ASIC), a field programmable gate array (FPGA) or another programmable logic device, a transistor logic device, a hardware component, or any combination thereof. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

When software is used to implement the embodiments, the method steps in the foregoing embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Finally, it should be noted that, the foregoing descriptions are exemplary implementations of this application, and are not intended to limit the protection scope of this application. Any variation or replacement readily derived by a person skilled in the art that are within the technical scope disclosed in this application shall fall within the protection scope of this application.

What is claimed is:

1. A data processing method, comprising:
   compressing a to-be-transmitted data stream to obtain a compressed data stream;
   determining a size of a first payload area based on the compressed data stream, wherein the first payload area is used to carry a forward error correction (FEC) code;
   generating a data frame based on the compressed data stream, wherein the data frame comprises an overhead area and a payload area, the payload area comprises the first payload area and a second payload area, and the second payload area carries the compressed data stream;
   performing an FEC processing to generate the FEC code to be stored in the first payload area; and
   sending the data frame that carries the FEC code;
   wherein the obtaining of the size of the first payload area of the compressed data stream comprises:
      obtaining a compression ratio of the compressed data stream, wherein the compression ratio is a ratio of a data volume of the compressed data stream to a data volume of the to-be-transmitted data stream; and
      determining the size of the first payload area based on the compression ratio.

2. The method according to claim 1, wherein the determining of the size of the first payload area based on the compression ratio comprises:
   obtaining a correspondence between at least one compression ratio interval and a payload area size;
   determining a target compression ratio interval to which the compression ratio belongs; and
   determining, based on the correspondence, the size of the first payload area that corresponds to the target compression ratio interval.

3. The method according to claim 2, wherein the generating of the data frame based on the compressed data stream comprises:
   performing rate adaptation on the compressed data stream; and
   mapping the rate-adapted compressed data stream to the data frame, wherein a digital encapsulation structure of the data frame comprises an optical data unit (ODU), an optical transport unit (OTU), or a flexible optical transport network (FlexO) frame.

4. The method according to claim 3, wherein a transmission rate of the data frame is less than a standard transmission rate corresponding to the digital encapsulation structure.

5. The method according to claim 4, wherein before compressing the to-be-transmitted data stream to obtain the compressed data stream, the method further comprises:
   converting a first data format of the to-be-transmitted data stream into a second data format, wherein a length of the second data format is less than that of the first data format.

6. The method according to claim 5, wherein the compressing of the to-be-transmitted data stream to obtain the compressed data stream comprises:
   compressing the to-be-transmitted data stream based on a preset compression algorithm to obtain the compressed data stream, wherein the compression algorithm comprises dictionary encoding or entropy encoding.

7. The method according to claim 1, wherein the to-be-transmitted data stream is a non-scrambled data stream.

8. A digital processing chip, wherein the chip comprises a processor and a memory, the memory and the processor are interconnected by a data line, the memory stores an instruction, and the processor is configured to execute the instruction to perform the following data processing method:
   compressing a to-be-transmitted data stream to obtain a compressed data stream;
   determining a size of a first payload area based on the compressed data stream, wherein the first payload area carries a forward error correction (FEC) code;
   generating a data frame based on the compressed data stream, wherein the data frame comprises an overhead area and a payload area, the payload area comprises the first payload area and a second payload area, and the second payload area carries the compressed data stream;
   performing an FEC processing to generate the FEC code to be stored in the first payload area; and
   sending the data frame;

wherein the obtaining of the size of the first payload area of the compressed data stream comprises:
  obtaining a compression ratio of the compressed data stream, wherein the compression ratio is a ratio of a data volume of the compressed data stream to a data volume of the to-be-transmitted data stream; and
  determining the size of the first payload area based on the compression ratio.

9. The digital processing chip according to claim 8, wherein the determining of the size of the first payload area based on the compression ratio comprises:
  obtaining a correspondence between at least one compression ratio interval and a payload area size;
  determining a target compression ratio interval to which the compression ratio belongs; and
  determining, based on the correspondence, the size of the first payload area that corresponds to the target compression ratio interval.

10. The digital processing chip according to claim 9, wherein the generating of the data frame based on the compressed data stream comprises:
  performing rate adaptation on the compressed data stream; and
  mapping the rate-adapted compressed data stream to the data frame, wherein a digital encapsulation structure of the data frame comprises an optical data unit (ODU), an optical transport unit (OTU), or a flexible optical transport network (FlexO) frame.

11. An optical transmission device, comprising:
  a processor, a memory, and an optical transceiver, wherein the processor, the memory, and the optical transceiver are interconnected by a data line, and the processor is configured to:
  compress a to-be-transmitted data stream to obtain a compressed data stream;
  determine a size of a first payload area based on the compressed data stream, wherein the first payload area carries a forward error correction (FEC) code;
  generate a data frame based on the compressed data stream, wherein the data frame comprises an overhead area and a payload area, the payload area comprises the first payload area and a second payload area, and the second payload area carries the compressed data stream;
  perform an FEC processing to generate the FEC code to be stored in the first payload area; and
  send the data frame to the optical transceiver; wherein the optical transceiver sends the data frame;
wherein the processor is configured to:
  obtain a compression ratio of the compressed data stream, wherein the compression ratio is a ratio of a data volume of the compressed data stream to a data volume of the to-be-transmitted data stream; and
  determine the size of the first payload area based on the compression ratio.

12. The optical transmission device according to claim 11, wherein the processor is configured to:
  obtain a correspondence between at least one compression ratio interval and a payload area size;
  determine a target compression ratio interval to which the compression ratio belongs; and
  determine, based on the correspondence, the size of the first payload area that corresponds to the target compression ratio interval.

13. The optical transmission device according to claim 11, wherein the processor is configured to:
  perform rate adaptation on the compressed data stream; and
  map the rate-adapted compressed data stream to the data frame, wherein a digital encapsulation structure of the data frame comprises an optical data unit (ODU), an optical transport unit (OTU), or a flexible optical transport network (FlexO) frame.

14. The optical transmission device according to claim 13, wherein a transmission rate of the data frame is less than a standard transmission rate corresponding to the digital encapsulation structure.

15. The optical transmission device according to claim 11, wherein before compressing the to-be-transmitted data stream to obtain the compressed data stream, the processor is further configured to:
  convert a first data format of the to-be-transmitted data stream into a second data format, wherein a length of the second data format is less than that of the first data format.

16. The optical transmission device according to claim 11, wherein the processor is configured to:
  compress the to-be-transmitted data stream based on a preset compression algorithm to obtain the compressed data stream, wherein the compression algorithm comprises dictionary encoding or entropy encoding.

17. The optical transmission device according to claim 11, wherein the to-be-transmitted data stream is a non-scrambled data stream.

* * * * *

UNITED STATES PATENT AND TRADEMARK OFFICE
CERTIFICATE OF CORRECTION

| | |
|---|---|
| PATENT NO. | : 12,021,615 B2 |
| APPLICATION NO. | : 17/554025 |
| DATED | : June 25, 2024 |
| INVENTOR(S) | : Junling Xiang et al. |

It is certified that error appears in the above-identified patent and that said Letters Patent is hereby corrected as shown below:

On the Title Page

Item (56), in Column 2, under "Other Publications", Line 3, delete "abstract )." and insert -- abstract). --.

In the Specification

In Column 1, Line 8, after "international" insert -- application --.

Signed and Sealed this
Twenty-fourth Day of September, 2024

Katherine Kelly Vidal
*Director of the United States Patent and Trademark Office*